US00RE37394B1

(19) United States
(12) Reissued Patent
Woodyard

(10) Patent Number: US RE37,394 E
(45) Date of Reissued Patent: Oct. 2, 2001

(54) SAFETY VEST

(75) Inventor: Clifford Woodyard, Kent, WA (US)

(73) Assignee: Guardian Fall Protection, Inc., Kent, WA (US)

(21) Appl. No.: 09/547,448

(22) Filed: Apr. 12, 2000

Related U.S. Patent Documents

Reissue of:
(64) Patent No.: 6,035,440
Issued: Mar. 14, 2000
Appl. No.: 09/154,790
Filed: Sep. 17, 1998

(51) Int. Cl.[7] ..... A62B 1/16; A62B 35/00
(52) U.S. Cl. ..... 2/102; 2/69; 182/3
(58) Field of Search ..... 2/102, 69, 94, 2/79, 85, 93, 300, 311, 312; 119/770; 128/846, 874, 875; 182/3, 4; 244/151 R

(56) References Cited

U.S. PATENT DOCUMENTS 2,290,218 * 7/1942 Vosseller ..... 244/143
2,887,286 * 5/1959 Morgan ..... 244/143
2,979,153 * 4/1961 Hoagland et al. ..... 182/3
4,076,101 * 2/1978 Himmelrich ..... 182/3
4,177,877 * 12/1979 Gallinati ..... 182/3
4,273,216 * 6/1981 Weissmann ..... 182/3
4,302,847 * 12/1981 Miles ..... 2/94
4,625,335 * 12/1986 Vinai ..... 2/69
4,731,882 * 3/1988 Ekman ..... 2/69
4,854,418 * 8/1989 Hengtenberger et al. ..... 182/3
5,136,724 * 8/1992 Grilliot et al. ..... 2/79

* cited by examiner

*Primary Examiner*—Gloria M. Hale
*Assistant Examiner*—Tejash Patel
(74) *Attorney, Agent, or Firm*—David L. Tingey

(57) ABSTRACT

A safety vest incorporates a safety harness between a vest inner lining and a vest outer shell with attachment couplers and rings incorporated in the vest in vest pockets that store the attachment couplers and rings out of sight in communicating between harness and a lanyard external to the vest. Thus, the attachment rings are stored in vest pockets except during use, making the vest appear as a normal garment suitable for general wear off a work location or during general harness nonuse periods. Storing the rings in vest pockets also avoids the rings becoming annoyances or hazards. The harness is multiuse and versatile with attachment rings and couplers in various locations on the harness so a wearer can move between different applications, including a ring on the dorsal back for use in fall arrest, rings on waist sides so the vest can be used for work positioning, a coupler at the sternum, a ring at the waist buckle for repel attachments, and leg straps for support below the waist when required. In each case, the attachment ring is conveniently stored out of sight during nonuse in a vest pocket. The safety harness can be inspected through the lumbar pocket.

20 Claims, 3 Drawing Sheets

(AMENDED)

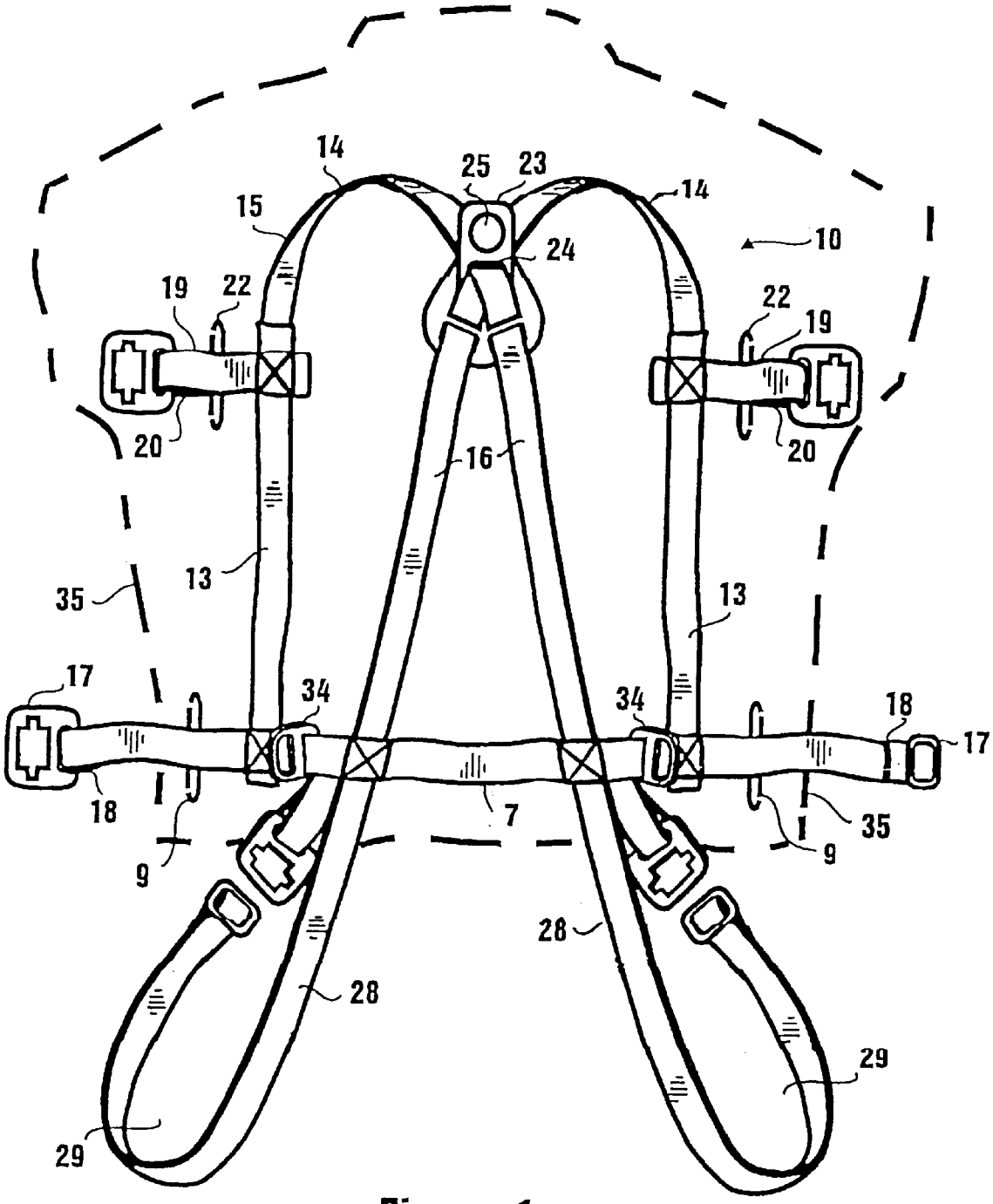
Figure 1
(AMENDED)

SAFETY VEST

Matter enclosed in heavy brackets [ ] appears in the original patent but forms no part of this reissue specification; matter printed in italics indicates the additions made by reissue.

*This is a reissue application of this inventor's application filed in the United States Patent and Trademark Office on Sep. 17, 1998 and assigned Ser. No. 09/154,790 and issued Mar. 14, 2000, under U.S. Pat. No. 6,035,440.*

BACKGROUND

1. Field of the Invention

This invention relates to safety harnesses and, more specifically, to a safety harness in combination with a vest or similar garment with retractable attachment rings.

2. Description of the Prior Art

Use of safety harnesses is well-known. Commonly, the harness is fabricated of a strong webbing fabric. The harness usually comprises a combination of straps that wrap the user's torso and perhaps his legs. Typically, one is worn by persons working at precarious heights to which is attached a lanyard connected to an anchor point. Various points of attachment to the vest are provided depending its intended use. Generally, a ring or other coupling mechanism is incorporated into the harness webbing to which the lanyard is attached. A common complaint of user's is that such a harness, though quite functional and adequate for its purpose, is at least inconvenient and sometimes difficult to put on.

There are several disclosures in the prior art that combine a safety harness with a garment such as a vest or a jacket with the harness inside, outside or between inner and outer shells of the garment. Thus, when the garment is put on in the normal manner, the harness attached thereto is also put on—the straps are constrained to maintain their intended relationship. As a result, putting on the harness is as simple as putting on a jacket.

Such a garment-safety harness combination remains a work garment, unsightly for wear off a work location, and it does not include leg straps in which a user can sit or be supported from below the waist.

SUMMARY

The present invention is directed to a safety harness incorporated between an inner lining and an outer shell of a vest with attachment couplers and rings incorporated in the vest as lanyard attachment points in vest pockets in communication with the harness. The rings are removable from the pockets while still attached to the harness for lanyard attachment external to the vest.

Thus, an object of the present invention is to present a garment such as a vest which incorporates a safety harness inside a vest outer shell. It is a further object that the attachment rings be stored in vest pockets except during use, making the vest appear as a more normal garment suitable for general wear off a work location or during general harness nonuse periods. Storing the rings in vest pockets also avoids the rings becoming annoyances or hazards, such as hitting or catching on things, when not in use with the harness.

It is another object that the harness be multiuse and versatile with attachment rings or couplers in various locations on the harness so a wearer can move between different applications. This is achieved in part by a ring on the dorsal back for use in fall arrest. Similarly, rings are provided on waist sides so the vest can be used for work positioning, such as when the user attaches himself to a wall and leans out onto the harness. A coupler is also provided at the sternum so the harness can be used with a cable grab lanyard for climbing a vertical cable. Another ring is provided at the waist buckle for repel attachments. In each case, the attachment ring is conveniently stored out of sight during nonuse in a vest pocket.

It is a further object that the harness include leg straps for support below the waist when required. This is achieved in a pair of straps each depending from a harness waist band with a distal end attachable to the waist band forming a loop around a user's leg. The leg straps are stored during nonuse in a rear vest pocket at the lumbar area. During use, the straps are pulled from the lumbar pocket.

It is a final object that the vest be adapted for physical inspection of the harness to check for wear and general integrity of the harness. This object is achieved in the lumbar pocket extending sufficiently across the vest back to allow the vest to be inverted, or turned inside out, with the harness between the vest inner lining and outer shell exposed to view.

BRIEF DESCRIPTION OF THE DRAWINGS

FIG. 1 is a back view of the safety harness of the present invention opened flat against an outline of a vest in which it is sewn.

DETAILED DESCRIPTION OF THE PREFERRED EMBODIMENTS

Figure 3:
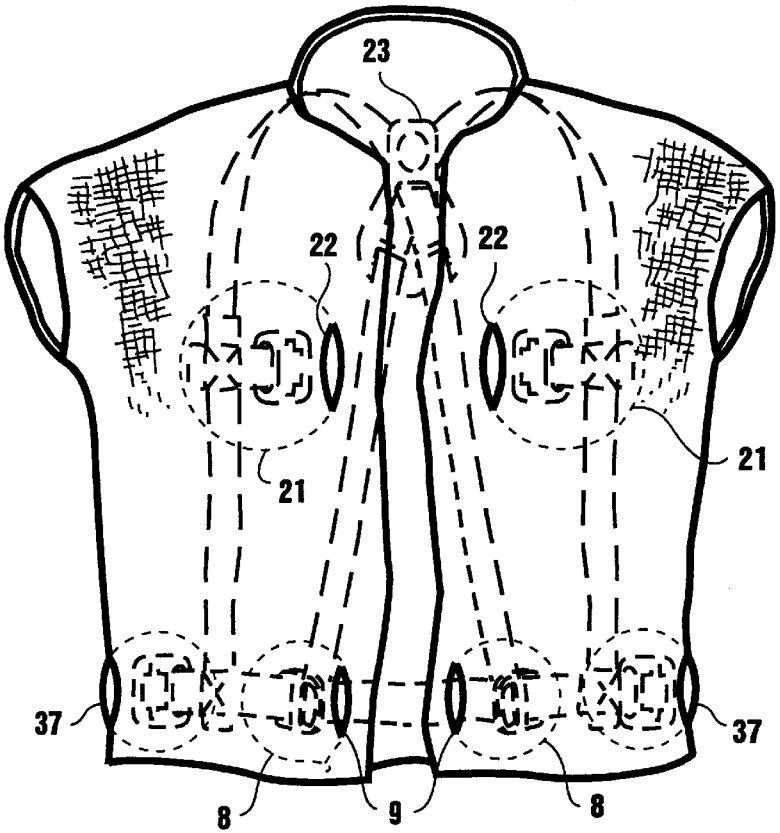
FIG. 3 is a front perspective view of the vest with attachment rings contained within their respective pockets with the safety harness shown hidden.
Figure 2:
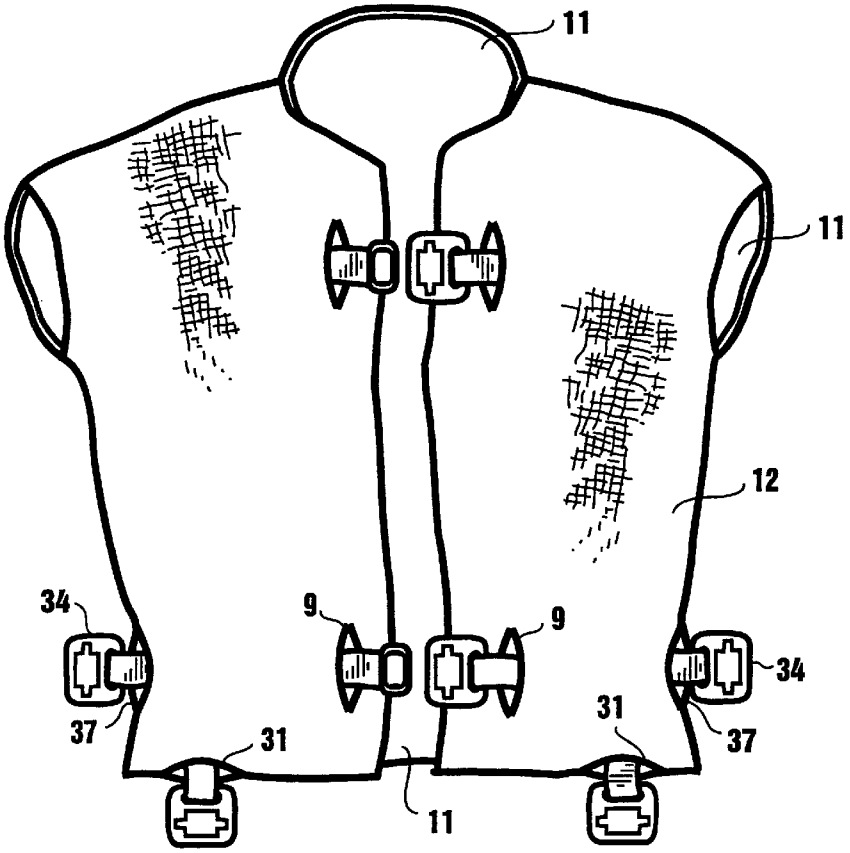
FIG. 2 is a front perspective view of the vest with attachment rings external their respective pockets.
Figure 5:
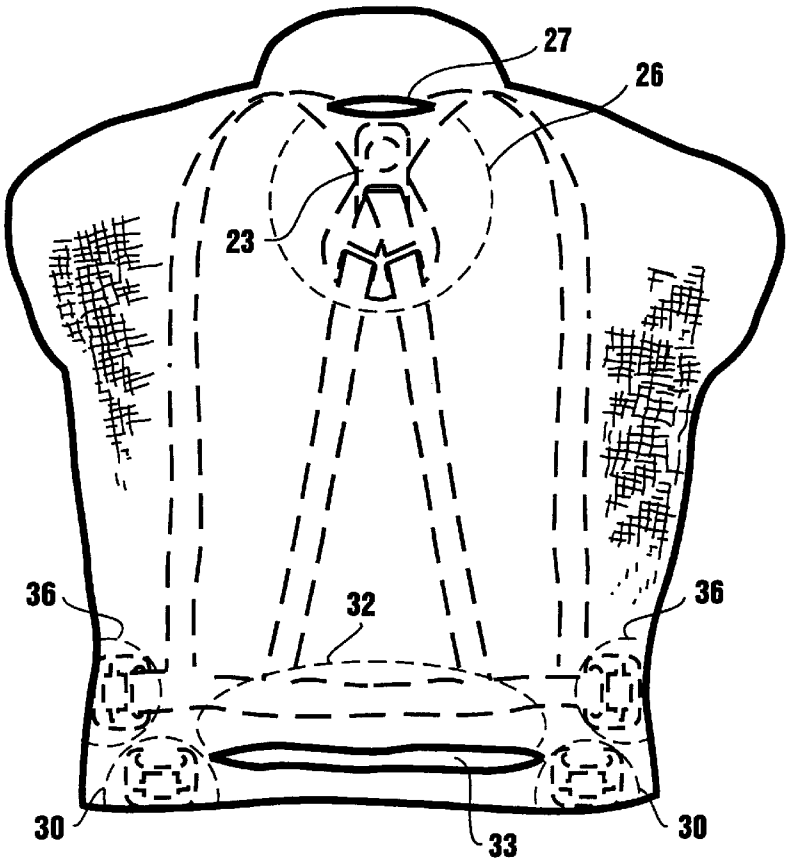
FIG. 5 is a back perspective view of the vest with attachment rings contained within their respective pockets.
Figure 4:
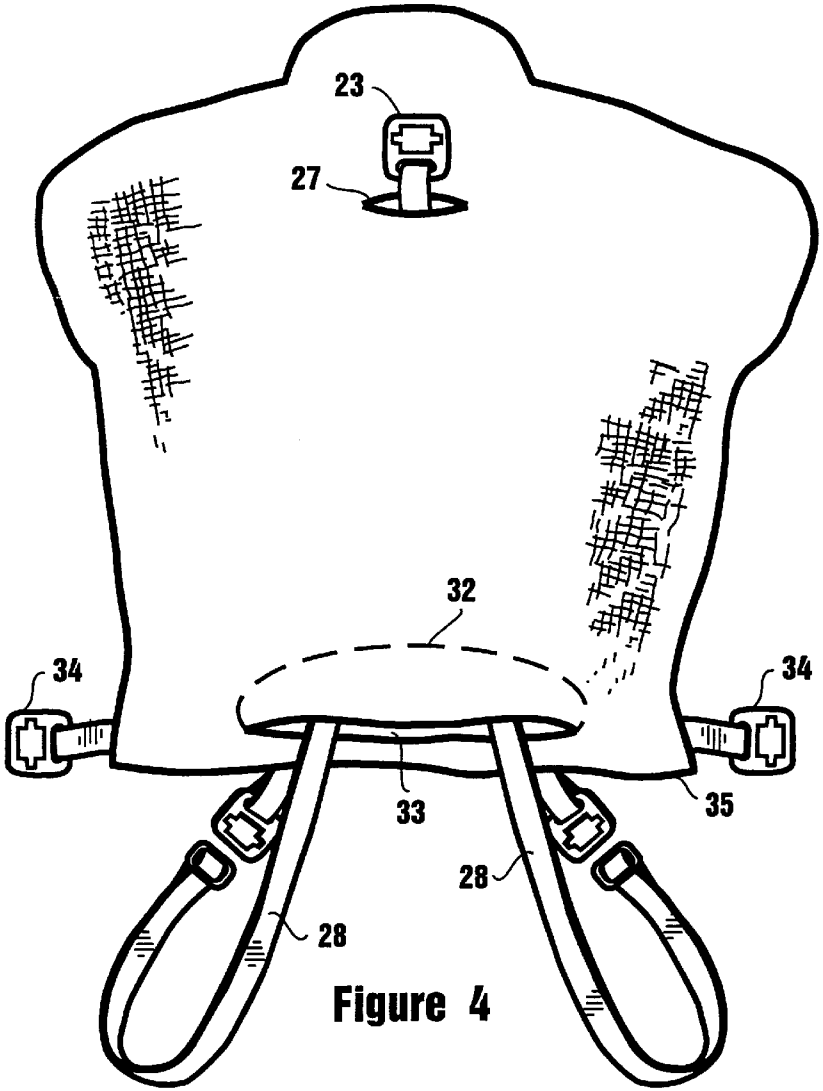
FIG. 4 is a back perspective view of the vest with attachment rings external their respective pockets.

The safety garment of the present invention comprises a safety harness 10 adapted with various associated attachment rings, couplers, and straps to receive a lanyard in secure releasable attachment thereto for anchoring the wearer of the garment to an anchor point.

To facilitate ease of putting on the harness and to fully cover the harness with its associated rings, couplers, and straps during nonuse such that it is not visible from external the garment, it is sewn into the inside of a vest, jacket, or similar garment adapted to fit around the wearer's torso, between garment inner lining 11 and outer shell 12. During periods of nonuse, the safety harness with its attachment rings, buckles, and straps are under the garment outer shell and unseen from outside the vest.

Pockets are provided in the garment outer shell with openings enabling access from the harness inside the garment to the lanyard external to the garment. Attachment straps extend from the harness opposite a pocket opening to an attachment coupler attached on its distal end and of length sufficient to pass from the harness through the pocket opening to outside the garment outer shell. The pockets also comprise a cavity in which the attachment coupler is stored during nonuse. The various pockets include front waist pockets 8 with openings 9 in the outer shell through which the waist belt ends may pass from inside the garment to outside the garment outer shell.

Referring to the figures, the harness 10 includes a waist belt [11] *7* and a pair of shoulder straps 12 each with strap ends 13 attached to the waist belt and each forming a shoulder loop 14 having a front shoulder loop strap portion 15 and a back shoulder loop strap portion 16, disposed over the garment shoulders such that the wearer's arms pass through the shoulder loops. [Matching belt couplers 17 on the belt ends 18 may be releasably interlocked as a buckle or coupled to a lanyard.]

A pair of sternum straps 19 are each attached at a sternum strap proximal end 20 to a respective front shoulder loop portion. Respective sternum pockets 21 are provided to store the sternum straps during nonuse out of sight. Sternum pocket openings 22 in the outer shell are provided through which the respective sternum straps pass from their storage position inside the sternum pocket to external the outer shell.

A dorsal ring 23 having a lanyard attachment hole 24 and a strap passthrough hole 25 is mounted on the back shoulder loop strap portions, said portions passing through the passthrough hole. The dorsal ring is disposed on the straps such that when the garment is worn, the dorsal ring is approximately in the wearer's dorsal area making the versatile safety garment useful for fall arrest. A dorsal ring pocket 26 is provided to store the dorsal ring with pocket openings 27 in the outer shell through which the dorsal ring may pass from its storage position to external the outer shell for attachment to a lanyard.

Two pair of releasably interlocking leg straps 28 depend from the waist belt as extensions of the shoulder strap, secured to the waist belt as it crosses, each pair forming a leg loop 29 below the waist belt for disposition around a wearer's leg. A pair of first leg strap pockets 30 are provided to respectively store the first leg straps during nonuse with openings 31 in the outer shell through which the respective first leg straps may pass from their storage positions inside the first leg strap pockets to external the outer shell. A vest lumbar pocket 32 is also provided in which the second leg straps may be stored and including an opening 33 in the outer shell through which the second leg straps may pass from their storage positions inside the lumbar pocket to external the outer shell. The lumbar is large and open to between the garment inner lining and outer shell therein providing access to the safety harness within for visible inspection.

A pair of positioning rings 34 are provided on the waist belt at the garment sides 35 for securing a wearer, for example, to a wall or to rebar during construction of a building. A pair of positioning ring pockets 36 are also provided in which the positioning rings may be stored during nonuse with openings 37 in the outer shell through which the positioning rings may pass from their storage positions inside the positioning ring pockets to external the outer shell for attachment to a lanyard.

Having described the invention, what is claimed is as follows:

1. A safety vest adapted to receive a lanyard in secure attachment thereto, the improvement comprising, a harness, the harness having a waist belt with belt ends and a pair of shoulder straps each with strap ends attached to the waist belt and each forming a shoulder loop having a front shoulder loop strap portion and a back shoulder loop strap portion and disposed such that the wearer's arms pass through the shoulder loops, an attachment means on the harness for securing the lanyard to the harness, a garment including an outer shell, the harness inside the outer shell, with pockets with openings in the outer shell providing access from the harness inside the garment to the lanyard external to the jacket, and at least one harness attachment strap extending from the harness opposite a pocket opening to the attachment means attached on its distal end and of length sufficient to pass from the harness through the pocket opening to outside the garment outer shell.

2. The safety vest of claim 1 in which the pockets comprise front waist pockets with openings in the outer shell through which the waist belt ends pass when extended from a storage position inside the garment to outside the garment outer shell.

3. The safety vest of claim 1 wherein said attachment means includes a waist belt attachment means on the ends of the waist belt for attaching a lanyard.

4. The safety vest of claim 1 further comprising an attachment means on the ends of the waist belt for interlocking the waist belt ends.

5. The safety vest of claim 1 further comprising a matching inner lining sewn to the outer shell with the harness sewn to the garment between the [two linings] *inner lining and the outer shell.*

6. The safety vest of claim 1 further comprising a pair of positioning rings on the waist belt, a pair of positioning ring pockets adapted to store the positioning rings with openings in the outer shell through which the positioning rings pass respectively when extended from their storage positions inside the positioning ring pockets to external the outer shell for attachment to a lanyard.

7. The safety vest of claim [6] *14* in which the positioning rings and positioning ring pockets are located on the waist belt at the garment sides.

8. A safety vest adapted to receive a lanyard in secure attachment thereto, the improvement comprising, a harness, the harness having a waist belt with belt ends and a pair of shoulder straps each with strap ends attached to the waist belt and each forming a shoulder loop having a front shoulder loop strap portion and a back shoulder loop strap portion and disposed such that the wearer's arms pass through the shoulder loops, an attachment means on the harness for securing the lanyard to the harness, a garment including an outer shell, the harness inside the outer shell, with pockets with openings in the outer shell providing access from the harness inside the garment to the lanyard external to the jacket, a left and a right sternum strap each attached at a sternum strap proximal end to a respective front shoulder loop portion, the sternum straps having releasably interlockable distal ends, a right and a left sternum pocket adapted to store the sternum straps with openings in the outer shell through which the respective sternum straps pass from their storage position inside the sternum pocket to external the outer shell.

9. The safety vest of claim 8 in which the sternum straps have releasably interlockable distal ends.

10. The safety vest of claim 1 further comprising a dorsal ring having a lanyard attachment hole and a strap passthrough hole through which the back shoulder loop strap portions pass, the dorsal ring being disposed on the straps such that when the garment is worn, the dorsal ring is approximately in the wearer's dorsal area, a dorsal ring pocket adapted to store the dorsal ring with openings in the outer shell through which the dorsal ring may pass from its storage position inside the dorsal ring pocket to external the outer shell for attachment to a lanyard.

11. A safety vest adapted to receive a lanyard in secure attachment thereto, the improvement comprising, a harness, the harness having a waist belt with belt ends and a pair of shoulder straps each with strap ends attached to the waist belt and each forming a shoulder loop having a front shoulder loop strap portion and a back shoulder loop strap portion and disposed such that the wearer's arms pass through the shoulder loops, an attachment means on the harness for securing the lanyard to the harness, a garment including an outer shell, the harness inside the outer shell, with pockets with openings in the outer shell providing access from the harness inside the garment to the lanyard external to the jacket, a first pair of releasably interlocking leg straps and a second pair of releasably interlocking leg straps, each leg strap of the first and second pair depending from the waist belt, a pair of first leg strap pockets adapted to respectively store the first leg straps with openings in the outer shell through which the respective first leg straps may pass from their storage positions inside the first leg strap pockets to external the outer shell, a vest lumbar pocket adapted to store the second leg straps with an opening in the outer shell through which the second leg straps may pass from their storage positions inside lumbar pocket to external the outer shell for use, the distal ends of first and second leg straps interlockable to form a loop around a wearer's leg.

12. The safety vest of claim 11 in which the second pair of leg straps are an extension of the shoulder strap forming a single strap with a first end attached to the waist belt and looping up to the shoulder and back again to and below the waist belt and looped back from below the waist belt for interlocking with the first pair of leg straps.

13. The safety vest of claim 11 in which the vest lumbar pocket is open to the safety harness between the garment inner and outer shells therein providing access to the safety harness for inspection.

14. A safety vest adapted to receive a lanyard in secure attachment thereto, the improvement comprising, a harness, the harness having a waist belt with belt ends and a pair of shoulder straps each with strap ends attached to the waist belt and each forming a shoulder loop having a front shoulder loop strap portion and a back shoulder loop strap portion and disposed such that the wearer's arms pass through the shoulder loops, an attachment means on the harness for securing the lanyard to the harness, including an attachment means on the ends of the waist belt for attaching the lanyard, a garment including an outer shell, the harness inside the outer shell, with pockets with openings in the outer shell providing access from the harness inside the garment to the lanyard external to the jacket, the pockets comprising a cavity in which the attachment means is stored during nonuse, and in which the pockets further comprise front waist pockets with openings in the outer shell through which the waist belt ends pass when extended from inside the garment to outside the garment outer shell, a left and a right sternum strap each attached at a sternum strap proximal end to a respective front shoulder loop portion, a right and a left sternum pocket adapted to store the sternum straps with openings in the outer shell through which the respective sternum straps pass from their storage position inside the sternum pocket to external the outer shell, the sternum straps having interlockable distal ends, a dorsal ring having a lanyard attachment hole and a strap passthrough hole through which the back shoulder loop strap portions pass, the dorsal ring being disposed on the straps such that when the garment is worn, the dorsal ring is approximately in the wearer's dorsal area, a dorsal ring pocket adapted to store the dorsal ring with openings in the outer shell through which the dorsal ring passes when extended from its storage position inside the dorsal ring pocket to external the outer shell for attachment to a lanyard, a first pair of leg straps and a second pair of leg straps, each leg strap of the first and second pair depending from the waist belt, a pair of first leg strap pockets adapted to respectively store the first leg straps with openings in the outer shell through which the respective first leg straps pass when extended from their storage positions inside the first leg strap pockets to external the outer shell, a vest lumbar pocket adapted to store the second leg straps with an opening in the outer shell through which the second leg straps pass when extended from their storage positions inside lumbar pocket to external the outer shell for use, the distal ends of first and second leg straps releasably interlockable to form a loop around a wearer's leg, a pair of positioning rings on the waist belt, a pair of positioning ring pockets adapted to store the positioning rings with openings in the outer shell through which the positioning rings pass respectively when extended from their storage positions inside the positioning ring pockets to external the outer shell, the positioning rings and positioning ring pockets located on the waist belt at the garment sides.

15. The safety garment of claim 14 further comprising at least one harness attachment strap extending from the harness opposite a pocket opening to the attachment means attached on its distal end and of length sufficient to pass from the harness through the pocket opening to outside the garment outer shell.

16. The safety vest of claim 14 further comprising a matching inner lining sewn to the outer shell with the harness between the two linings.

17. The safety vest of claim 14 in which the second pair of leg straps are an extension of the shoulder strap forming a single strap with a first end attached to the waist belt and looping up to the shoulder and back again to and below the waist belt and looped back from below the waist belt for interlocking with the first pair of leg straps.

*18. A safety vest adapted to receive a lanyard in secure attachment thereto,*

*the improvement comprising,*

*a harness including a pair of shoulder straps,*

*an attachment means on the harness for securing the lanyard to the harness,*

*a garment including an outer shell, the harness inside the outer shell, with a pocket with an opening in the outer shell providing access from the harness inside the garment to the lanyard external to the garment, and*

*at least one harness attachment strap extendable from the harness opposite said pocket opening to the attachment means attached on its distal end and of length sufficient to pass from the harness through the pocket opening to outside the garment outer shell, said harness attachment strap storable within the outer shell pocket during nonuse.*

*19. The safety vest of claim 18 further comprising an inner lining inside the outer shell with the harness in a cavity formed between the inner lining and the outer shell.*

*20. The safety vest of claim 19 wherein said pockets are defined by said cavity.*

* * * * *

UNITED STATES PATENT AND TRADEMARK OFFICE

CERTIFICATE OF CORRECTION

PATENT NO. : RE 37,394 E
DATED : October 2, 2001
INVENTOR(S) : Woodyard

It is certified that error appears in the above-identified patent and that said Letters Patent is hereby corrected as shown below:

Column 3,
Lines 62-63, change “pockets with openings” to -- a pocket with an opening --.

Column 4,
Line 40, change “pockets with openings” to -- a pocket with an opening --.

Column 5,
Line 8, change “pockets with openings” to -- a pocket with an opening --.

Signed and Sealed this

Twenty-ninth Day of October, 2002

*Attest:*

*Attesting Officer*

JAMES E. ROGAN
*Director of the United States Patent and Trademark Office*